United States Patent
Zhang et al.

(10) Patent No.: US 8,815,997 B2
(45) Date of Patent: *Aug. 26, 2014

(54) AQUEOUS COMPOSITIONS COMPRISING ION EXCHANGE RESINS THAT DELIVER PAINT AND PRIMER PROPERTIES IN A COATING

(75) Inventors: Wei Zhang, Ambler, PA (US); Ozzie M. Pressley, Cheltenham, PA (US); Monica A. Luckenbach, Woxall, PA (US); James C. Bohling, Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 171 days.

This patent is subject to a terminal disclaimer.

(21) Appl. No.: 13/453,057

(22) Filed: Apr. 23, 2012

(65) Prior Publication Data

US 2012/0277334 A1 Nov. 1, 2012

Related U.S. Application Data

(60) Provisional application No. 61/480,607, filed on Apr. 29, 2011, provisional application No. 61/497,253, filed on Jun. 15, 2011.

(51) Int. Cl.
 *C08L 31/00* (2006.01)
 *C08J 5/20* (2006.01)
(52) U.S. Cl.
 USPC ............................................ 524/556; 521/28
(58) Field of Classification Search
 USPC ....................................................... 524/556
 See application file for complete search history.

(56) References Cited

U.S. PATENT DOCUMENTS

| | | |
|---|---|---|
| 3,494,878 A | 2/1970 | Harren et al. |
| 3,847,857 A | 11/1974 | Haag et al. |
| 4,283,499 A | 8/1981 | Howell |
| 5,192,446 A | 3/1993 | Salem et al. |
| 5,922,777 A | 7/1999 | Van Rheenen |
| 5,947,632 A | 9/1999 | Pirotta et al. |
| 6,492,451 B1 | 12/2002 | Dersch et al. |
| 6,696,519 B2 | 2/2004 | Brown et al. |
| 6,815,466 B2 * | 11/2004 | Van Rheenen .................. 521/29 |
| 8,158,714 B2 * | 4/2012 | Nair et al. ...................... 524/556 |
| 2005/0107527 A1 | 5/2005 | Holub et al. |
| 2009/0171005 A1 | 7/2009 | Finegan et al. |
| 2009/0176127 A1 * | 7/2009 | Matthews et al. ............. 428/704 |

FOREIGN PATENT DOCUMENTS

| | | |
|---|---|---|
| EP | 1316591 A2 | 6/2003 |
| WO | 9925780 A1 | 5/1999 |

* cited by examiner

*Primary Examiner* — Hui Chin
(74) *Attorney, Agent, or Firm* — Andrew E. C. Merriam

(57) ABSTRACT

The present invention provides one component aqueous compositions comprising (i) from 0.01 to 7 wt. %, based on the total weight of solids in the composition, of anion exchange resin beads having a weight average particle size of from 0.1 to 20 μm a low crosslinker content, the anion exchange resin copolymer beads being chosen from gelular beads, beads having a dual morphology, and mixtures thereof, (ii) an emulsion copolymer having a copolymerization residue of one or more phosphorus acid monomer, and having an anionic surfactant or its polymerization residue and a reductant or its polymerization residue and, (iii) at least one phosphorous containing surfactant in the amount of from 0.1 to 5 wt. %, based on the weight of emulsion copolymer solids. The compositions find use as coating binders and either pigmented or unpigmented paints and enable the provision of a single coat primer plus topcoat with excellent stain blocking.

11 Claims, No Drawings

AQUEOUS COMPOSITIONS COMPRISING ION EXCHANGE RESINS THAT DELIVER PAINT AND PRIMER PROPERTIES IN A COATING

The present invention relates to one component aqueous compositions comprising an emulsion copolymer having one or more phosphorus acid functional group, fine particle size anion exchange resin copolymer beads, and a phosphorus containing surfactant suitable for use in single coat primer plus topcoat applications having exceptional stain block resistance. More specifically, it relates to aqueous coating compositions comprising from 0.01 to 7 wt. %, based on the total weight of solids in the composition, of anion exchange resin copolymer beads having a weight average particle size of 20 µm or less, preferably, 10 µm or less, and having a copolymerized crosslinker content of from 0.5 to 2.0 wt. %, one or more emulsion copolymer having a copolymerized residue of at least one phosphorus acid monomer, and at least one phosphorous containing surfactant, to methods for making the compositions and to methods for using the compositions to form a single coat primer plus topcoat.

Over the last 50 years, the architectural coatings market has seen the slow conversion from solvent-borne (SB) to more environmentally friendly waterborne (WB) technologies. However, one market segment where WB technology has only achieved limited penetration is in the area of stain blocking coating compositions. The resistance to this conversion stems from competition by SB alkyd coatings which have excellent barrier properties that result from their inherent film formation ability and hydrophobic nature.

Numerous attempts have been made over the years to simulate the performance of SB alkyd primers through a combination of hydrophobic and low molecular weight (MW) emulsion polymers. Despite the success of a number of commercial WB products, true alkyd-like stain blocking performance has been difficult to accomplish. An even more challenging problem has been the difficulty of engineering a WB emulsion polymer to deliver excellent primer properties while delivering outstanding top coat performance. In water based emulsion polymer systems, it has proven very difficult to make a coating that forms a complete physical barrier on a coated substrate.

Recently, U.S. Pat. No. 6,815,466B2, to Van Rheenen, discloses a colloidally and sedimentation stable coating composition containing an anionic ion exchange resin (IER) and an emulsion polymer made in the presence of a nonionic surfactant or a nonionic protective colloid such as polyvinyl alcohol (PVOH) or hydroxyethyl cellulose (HEC). The nonionically stabilized emulsion polymer forms a structured network with the IER through weak interactions, thereby forming a network that gives the composition colloidal and sedimentation stability without the need for a water soluble film-forming polymer aside from the protective colloid. The resulting composition forms stain resistant coatings. However, the Van Rheenen compositions need the protective colloid to provide the disclosed stability and the topcoat performance of the Van Rheenen compositions is compromised by the ion exchange resins used therein or by the use of large amounts of such resins.

The present inventors have endeavored to solve the problem of providing aqueous compositions, especially those having a low VOC (volatile organic compound) content, that deliver primer stain blocking and adhesion and topcoat performance, in particular scrub resistance and stain removal in a coating.

STATEMENT OF THE INVENTION

In accordance with the present invention, one component aqueous compositions comprise (i) from 0.01 to 7 wt. %, based on the total weight of solids in the composition, or, preferably, 4 wt. % or less, of anion exchange resin copolymer beads having a weight average particle size of from 0.1 to 20 µm or, preferably, 10 µm or less and having a having a copolymerized crosslinker content of from 0.5 to 2.0 wt. %, based on the total weight of monomers used to make the anion exchange resin copolymer, preferably, 0.7 to less than 2.0 wt. %, the anion exchange resin beads being chosen from gelular beads, beads having a dual morphology, and mixtures thereof, (ii) one or more emulsion copolymer having a copolymerization residue of one or more phosphorus acid monomer, preferably, having in addition a copolymerization residue of an acid-functional or anionic monomer, as well as, having an anionic surfactant or its polymerization residue and a reductant or its polymerization residue, and (iii) at least one phosphorous containing surfactant in the amount of from 0.1 to 4 wt. %, or, preferably, from 0.2 to 2 wt. %, based on the weight of emulsion copolymer solids.

The anion exchange resin copolymer of the present invention preferably has quaternary ammonium anion exchange groups.

Preferably, to provide enhanced scrub resistance, the emulsion copolymer of the present invention includes the copolymerized residue of one or more unsaturated beta-dicarbonyl monomer or unsaturated cyanocarbonyl monomer, which may be in the enamine form.

The phosphorous containing surfactant of the present invention may be chosen from a phosphate surfactant, a phosphonate surfactant, and mixtures thereof. Preferably, the phosphorus containing surfactant is an alkyl alkoxylated phosphate, such as, for example, an alkyl ethoxylated phosphate.

The present invention also provides coating compositions, comprising the aqueous compositions of the present invention. The coating compositions can be pigmented or unpigmented, and may comprise opacifiers, such as $TiO_2$, void containing polymers or their admixtures. Such coating compositions are, preferably, low VOC compositions having a VOC content of from 0 g/l to 150 g/l, or, preferably, less than 100 g/l.

The present invention also provides methods for using the coating compositions of the present invention as a single coat primer plus topcoat comprising applying the coating composition to a substrate which has no primer on it to form a coating having improved stain block resistance.

In another aspect the present invention provides methods for making aqueous binder compositions comprising aqueous emulsion polymerizing at least one ethylenically unsaturated monomer, one or more phosphorus acid monomer and, preferably, one or more acid-functional or anionic monomer, in the presence of a free radical redox initiator system, preferably, including both a water-soluble oxidizing agent and a water-insoluble oxidizing agent, and in the presence of an anionic surfactant to form the emulsion copolymer; and, formulating the emulsion copolymer with a phosphorus containing surfactant and an anion exchange resin copolymer to form an aqueous composition having the anion exchange resin of the present invention in the amount of from 0.01 to 7 wt. %, based on the total weight of solids in the composition, and the phosphorous containing surfactant of the present invention in the amount of from 0.1 to 5 wt. %, or, preferably, from 0.1 to 3 wt. %, based on the weight of emulsion copolymer solids.

Preferably, to reduce the residual monomer content within the aqueous emulsion copolymer, it is treated with a redox pair after polymerization.

As used herein, the term "beta-dicarbonyl monomer" includes ethylenically unsaturated acetoacetoxy-functional monomers and ethylenically unsaturated acetoacetamido-functional monomers, and the term "cyanocarbonyl monomer" includes ethylenically unsaturated cyanoacetoxy-functional monomers, and ethylenically unsaturated cyanoacetamido-functional monomers.

As used herein, the term "calculated Tg" refers to the glass transition temperature of a polymer made from a mixture of monomers as calculated by the Fox Equation (T. G. Fox, Bull. Am. Physics Soc. Vol. 1, (1956)).

As used herein, the term "dual morphology" refers to anion exchange resin beads which can be reversibly converted from a dry, gelular morphology to a macroreticular, hydrated morphology by contact with water.

As used herein, the term "gelular" refers to anion exchange resin beads that predominantly contain pores that are less than 30 Å in diameter, and which pores are of a molecular nature as a part of the gel structure. These gel pores are generally synthesized by a method which does not include the use of an inert, co-solvent. A synonym for gelular is microreticular.

As used herein, the term "macroreticular" or "macroporous" refers to anion exchange resins that contain a significant proportion of extra gelular pores that are not a part of the gel structure, which pores are generally greater than 30 Å in diameter. The pores are large compared to atomic dimensions of an associated resin matrix which defines the pores.

As used herein, the term "polymerization residue" or "polymerization product" or "copolymerization residue" or "copolymerization product" refers to the form of a material that results from it having been included in a polymerization reaction. So, for monomers, it refers to that portion of the resulting polymer or copolymer that corresponds to the monomer that was polymerized or copolymerized; for surfactants, catalysts and other materials, it refers to the form of such materials as they exist in the product polymer or copolymer.

As used herein, the phrase "solids" or "total solids" refers to weight amounts of any given material in comparison to the total weight amount of all of the non-volatile ingredients in the aqueous composition (e.g. emulsion copolymer(s), anion exchange resins, surfactants, redox compounds, catalysts, pigments, colorants, extenders, non-volatile coalescents, and the like)

As used herein, the term "stain resistance" refers to the ability of a coating to resist the stain when the coating is exposed to the staining material, and the term "scrub resistance" refers to the ability of a coating to withstand scrubbing to remove the residual staining material that the coating did not fully resist.

As used herein, the term "weight average particle size" refers to the average particle size of a sample of anion exchange resins as measured on a Mastersizer 2000 (Malvern Instruments Ltd., Malvern, UK).

As used herein, "wt. %" or "wt. percent" means weight percent.

As used herein, the term "w/w" means weight ratio of one ingredient to another. For example 28% w/w aqua ammonia means 28 wt. % concentration of ammonia in water.

The singular forms "a," "an," and "the" include plural referents unless the context clearly dictates otherwise. Unless defined otherwise, technical and scientific terms used herein have the same meaning as is commonly understood by one skilled in the art.

Unless otherwise indicated, any term containing parentheses refers, alternatively, to the whole term as if no parentheses were present and the term without that contained in the parentheses, and combinations of each alternative. Thus, the term "(meth)acrylate" encompasses, in the alternative, methacrylate, or acrylate, or mixtures thereof.

The endpoints of all ranges directed to the same component or property are inclusive of the endpoint and independently combinable. Thus, for example, a disclosed range of a ratio of 0.1 to 7 wt. %, preferably, 1 to 4 wt. %, or, more preferably, less than 2.5 wt. %, means any and all of 0.1 to 7 wt. %, 0.1 to 1 wt. %, 0.1 to 2.5 wt. %, 0.1 to 4 wt. %, 1 to less than 2.5 wt. %, 1 to 4 wt. %, 1 to 7 wt. %, 2.5 to 4 wt. %, 2.5 to 7 wt. % and 4 to 7 wt. %.

Unless otherwise indicated, conditions of temperature and pressure are room temperature (~20-22° C.) and standard pressure, also referred to as "ambient conditions".

The present applicants have discovered an aqueous coating composition that delivers the excellent stain blocking performance of a solvent borne alkyd as well as exceptional opacity and adhesion of a primer coat, while providing excellent topcoat performance in household stain removal and scrub resistant surface properties. Such aqueous compositions comprise an emulsion copolymer containing the copolymerization residue of a phosphorus acid monomer, and the polymerization residue of an anionic surfactant, a small amount of a fine particle size anion exchange resin having a gelular or a dual morphology, and a phosphorus containing surfactant.

To retain suitable topcoat properties, anion exchange resin copolymers of the present invention have the highest diffusion capacity for absorbing staining materials so as act most efficiently and in the lowest concentrations, thereby improving composition stability and topcoat properties in coatings made from the composition. Anion exchange resins are ion exchange resin particles having a positively charged surface and positively charged sites throughout the particles that hold and exchange negatively charged ions, even if ground to low average particle size. The positively charged sites may be formed, for example, on copolymers of styrene or divinylbenzene which are chloromethylated and then reacted to form quaternary ammonium groups therein by means of tertiary amines or to form simple amine groups by means of primary or secondary amines. Such anion exchange resins are gelular or have a dual morphology. In contrast, with a macroporous anion exchange resin, the functionality is on the surface.

In anion exchange resins, the polymer bearing the exchange groups is crosslinked and insoluble in water. The level of crosslinker in these resins is a compromise between processability of the resin in a packed bed column or chemical reactor and diffusion of other materials between the chains of the polymer. A lightly crosslinked polymer, such as those used in forming gelular beads and dual morphology beads allows for the best diffusion of contaminates through the resin to the functional groups. While such lightly crosslinked beads may deform or be damaged in processing in an ion exchange column or medium, the anion exchange beads of the present invention are not subject to such processing forces in coatings applications. At the lower limit of crosslinking, the anion exchange resin copolymer expands to the point which in takes up too much volume in the paint or coating is soluble in aqueous media. Accordingly, it is desirable to have a low level of crosslinking in the anion exchange resin copolymers of the present invention, such as, for example, from 0.5 to 2 wt. %, based on the total weight of monomers used to make the anion exchange resin copolymer, or, preferably, 0.7 wt. % or more to less than 2.0 wt. %, or, preferably, 1.5 wt. % or less than 2 wt %.

In a suitable anion exchange resin copolymer, the backbone of the resin may be crosslinked styrene, acrylic, phenol formaldehyde or other hydrolytically stable polymer. Preferred backbones are crosslinked acrylic and crosslinked styrene; most preferred is crosslinked styrene. Anion exchange resins suitable for stain blocking in coating compositions include those containing functional groups capable of binding stain bodies, such as, for example, quaternary amines, amino phosphonic, amino diacetic, glucamine or other anion exchange groups. Preferred exchange groups may include, for example, quaternary ammonium groups such as those made by functionalizing chloromethyl polystyrene with trimethyl amine, trimethanol amine, tributyl amine or other trialkyl amines, most preferably, trimethyl amine. Alternatively, suitable ion exchange resins may comprise functionalized crosslinked acrylic copolymers such as a copolymer of dimethylaminopropyl acrylamide and divinyl benzene (DVB) quaternized with methyl iodide. Other options would be to use a phenol formaldehyde resin which has been functionalized with trialkyl ammonium groups or a condensation reaction between at least one polyamine and epichlorohydrin. It is possible to choose selective functional groups to remove specific contaminates. Examples of polymers and functional groups which may be used to make the anion exchange resins can be found in Arshady, R., Margel, S., Pichot, C., and Delair, T., *Preformed Microspheres*, MML Series, Volume 1, Chapter 6 "Functionalization", 1999 Citus Books, pp. 169-195; and in U.S. Pat. No. 3,494,878 to Harren et al. Materials such as "Merrifield's Resin" (Chloromethylated Polystyrene with 1% DVB.) which has been aminated with a trialkyl amine would be quite suitable.

The amount of cationic groups in the anion exchange resin of the present invention may range from 0.5 to 2.0 cation groups, e.g. quaternary ammonium, per monomer, e.g. styrene, acrylate or epichlorohydrin excluding crosslinkers.

The weight average particle size of the anion exchange resin copolymer of the present invention should range from 0.1 to 20 µm, or, preferably, 10 µm or less, or, preferably, 5 µm or less, or, preferably, 0.5 µm or more, or, more preferably, 3 µm or more or up to 8 µm. Such particle sizes should be low enough to provide film formation without texture or grit (aka colloidal stability) and to enable sedimentation stability (shelf stability) in water; at the same time, an anion exchange resin having too low of a particle size complexes anionic surfactant, phosphorus containing surfactant and the emulsion copolymer having copolymerized phosphorus acid monomer and thereby impairs shelf stability and topcoat performance.

Suitable amounts of anion exchange resin copolymer beads may range from 0.1 to 7 wt. %, based on the total weight of solids in the composition, preferably, from 1 to 4 wt. %, or, more preferably, less than 2.5 wt. %. While more anion exchange resin means better stain resistance, as the ion exchange resin absorbs water, too much of it could ruin topcoat properties.

Suitable amounts of anion exchange resin beads may range from 0.1 to 7 wt. %, based on the total weight of solids in the composition, preferably, from 1 to 4 wt. %, or, more preferably, less than 2.5 wt. %. While more anion exchange resin means better stain resistance, as the ion exchange resin absorbs water, too much of it could ruin topcoat properties. At a low concentration of, e.g. 1-2 wt. %, based on the total weight of solids in the composition, anion exchange resins enable the compositions of the present invention to provide excellent stain blocking primer performance while maintaining superior top coat properties.

Suspension polymerization processes may be used to make the anion exchange resin copolymer and are well known in the art; see for example U.S. Pat. No. 4,283,499. Typically, suspension polymerization produces crosslinked polystyrene ion exchange resins having a weight average particle size of approximately 100 to 500 µm. Anion exchange resins can also be made via conventional polymerization in bulk in and aqueous emulsion polymerization. Emulsion polymerized anion exchange resin copolymers may have a desired weight average particle size (0.1 to 1 µm) from polymerization.

If needed, anion exchange resins may be ground by any milling equipment suitable for producing beads in the size range of the present invention. Suitable mills are attrition mills, fluid-energy mills, colloid mills, vibratory ball mills (vibro-energy mills), pin mills, ball mills, roller mills, and autogenous and semiautogenous mills. Likewise a combination of mills could be used to possibly increase speed where the first mill reduces particle size to, for example, less than 100 µm and a second mill reduces the particle size further to the desired range. An example would be the initial use of a hammer mill followed by a semiautogenous mill like a Dyno-Mill® from CB Mills Inc (Buffalo Grove, Ill.). Where grinding is necessary, the anion exchange resins of the present invention are more easily ground in the wet state. For example, the anion exchange resin can be ground in the presence of an emulsion copolymer or first ground and then blended with the emulsion copolymer. Agitators such as a Red Devil Paint Conditioner, Model #5410-00 (Union, N.J.) could also be used with appropriate milling media, e.g. zirconia.

The aqueous emulsion copolymer of the present invention comprises the polymerization residue of a phosphorus acid monomer. The emulsion copolymer may be the polymerization product of (i) from 0.3 to 3.0% wt. %, based on the total weight of monomers used to make the emulsion copolymer, of the phosphorus acid monomer, (ii) 20 wt. % or more, based on the total weight of monomers used to make the emulsion copolymer, of one or more monomers for making soft copolymers chosen from ethyl acrylate, methyl acrylate, butyl acrylate, benzyl acrylate, ethylhexyl acrylate, 2-ethylhexyl methacrylate, hexyl methacrylate, octyl methacrylate, fatty acid methacrylates, such as lauryl methacrylate, stearyl(meth)acrylate, cetyl(meth)acrylate or eicosyl methacrylate, and mixtures thereof, preferably, chosen from ethyl acrylate, butyl acrylate, ethylhexyl acrylate, and mixtures thereof; and (iii) up to 79.7% wt. %, based on the total weight of monomers used to make the emulsion copolymer, of one or more other monoethylenically unsaturated monomers excluding monomers (i) and (ii).

Preferably, the emulsion copolymer of the present invention further comprises anionic functional groups, such as, for example, carboxylic acids, anhydrides, aldehydes and amides mixtures thereof and combinations thereof.

Preferably, the amount of copolymerized phosphorus acid monomer in the emulsion copolymer may range from 0.5 to 2.5 wt. %, or, more preferably 0.6 to 2 wt. %, based on the total weight of monomers used to make the emulsion copolymer.

Examples of suitable phosphorus acid monomers include dihydrogen phosphate esters of an alcohol in which the alcohol also contains a polymerizable vinyl or olefinic group, such as allyl phosphate; mono- or diphosphate of bis(hydroxymethyl)fumarate or itaconate; derivatives of (meth)acrylic acid esters, such as, for example, phosphates of hydroxyalkyl-(meth)acrylate including 2-hydroxyethyl-(meth)acrylate, 3-hydroxypropyl-(meth)acrylates, and the like. Thus, dihydrogen phosphate ester monomers include phosphoalkyl(meth)acrylates, such as 2-phosphoethyl(meth) acrylate, 2-phosphopropyl(meth)acrylate, 3-phosphopropyl (meth)acrylate, phosphobutyl(meth)acrylate and 3-phospho-2-hydroxypropyl(meth)acrylate. For purposes of the present invention, phosphoalkyl(meth)acrylates include ethylene oxide condensates of (meth)acrylates such as $H_2C=C(CH_3)COO(CH_2CH_2O)_nP(O)(OH)_2$, and the analogous propylene oxide condensates similarly, where n is from 1 to 50 in each case. Phosphoalkyl crotonates, phosphoalkyl maleates, phosphoalkyl fumarates, phosphodialkyl(meth)acrylates, phosphodialkyl crotonates, and allyl phosphate can all be used. Other suitable phosphorus-containing monomers are phosphonate-functional monomers, such as those disclosed in WO 99/25780 A1, and include vinyl phosphonic acid, allyl phosphonic acid, 2-acrylamido-2-methylpropanephosphinic acid, α-phosphonostyrene, and 2-methylacrylamido-2-methylpropanephosphinic acid. Still other suitable phosphorus-containing monomers are 1,2-ethylenically unsaturated (hydroxy) phosphinylalkyl(meth)acrylate monomers, such as disclosed in U.S. Pat. No. 4,733,005, and include (hydroxy)phosphinylmethyl methacrylate.

Preferred phosphorus-containing monomers, (i), are phosphates of hydroxyalkyl methacrylates, with 2-phosphoethyl (meth)acrylate (PEM) being the most preferred.

Suitable other monoethylenically unsaturated monomers (iii) may include monomers such as, for example, (meth) acrylic ester monomers including, for example, $C_1$ to $C_{30}$ (cyclo)alkyl(meth)acrylates, such as, for example methyl methacrylate, ethyl methacrylate, butyl methacrylate, decyl acrylate, (meth)acrylamide, substituted (meth)acrylamides, such as N-alkyl(meth)acrylamides and N,N-dialkyl(meth) acrylamides; ethylene; propylene; styrene and substituted styrenes; butadiene; vinyl esters, such as vinyl acetate and vinyl butyrate; vinyl chloride, vinyl toluene, and vinyl benzophenone; (meth)acrylonitrile; and vinylidene halides, such as, vinylidene chloride; and mixtures thereof.

Preferably, the other monoethylenically unsaturated monomers (iii) used to make the emulsion copolymer of the present invention may include acid-functional or anionic monomers for added composition stability. In a preferred embodiment, the emulsion copolymer may comprise from 0.1 to 2.0 wt. %, based on the total weight of monomers used to make the emulsion copolymer, or, preferably 0.2 to 1.0%, or, more preferably 0.4 to 0.6%, by weight of the copolymer, of acid-functional or anionic monomer, in polymerized form.

Suitable acid-functional or anionic monomers may be, for example, monoethylenically unsaturated carboxylic acid, anhydride or amide monomers such as, for example, acrylic acid, methacrylic acid, crotonic acid, itaconic acid, fumaric acid, maleic acid, maleic anhydride, monomethyl itaconate, monomethyl fumarate, monobutyl fumarate, and maleic anhydride; salts thereof, e.g. sodium acrylic acid; monomers containing sulfur acid groups, such as, for example, 2-acrylamido-2-methyl-1-propanesulfonic acid, sulfoethyl(meth) acrylate, sodium styrene sulfonate, and vinyl sulfonic acid; (meth)acrylamide, substituted (meth)acrylamides, such as N-alkyl(meth)acrylamides and N,N-dialkyl(meth)acrylamides; and N-methylol(meth)acrylamide. Preferred anionic monomers are (meth)acrylic acid, itaconic acid, fumaric acid and maleic acid.

Preferably, to provide enhanced scrub resistance, the other monoethylenically unsaturated monomers (iii) used to make the emulsion copolymer of the present invention include one or more beta-dicarbonyl monomer or cyanocarbonyl monomer, which may be in the enamine form, preferably, also comprising acid-functional or anionic monomers. One such suitable emulsion copolymer comprises from 0.5 to 5.0 wt. %, based on the total weight of monomers used to make the emulsion copolymer, or, preferably 1.0-3.0 wt. %, of a beta-dicarbonyl monomer or a cyanocarbonyl monomer. In one such embodiment, the beta-dicarbonyl monomer or cyanocarbonyl monomer is selected from the group consisting of: acetoacetoxy-functional monomers, acetoacetamido-functional monomers, cyanoacetoxy-functional monomers, and cyanoacetamido-functional monomers, and combinations thereof. For example, the beta-dicarbonyl monomer or cyanocarbonyl monomer may be acetoacetoxyethyl methacrylate (AAEM).

Suitable acetoacetoxy-functional monomers may include, for example, acetoacetoxyethyl(meth)acrylate, acetoacetoxypropyl(meth)acrylate, allyl acetoacetate, acetoacetoxybutyl (meth)acrylate, 2,3-di(acetoacetoxy)propyl(meth)acrylate, and vinyl acetoacetate. In general, any polymerizable hydroxy-functional monomer can be converted to the corresponding acetoacetate by reaction with a diketene or other suitable acetoacetylating agent.

Suitable acetoacetamido-functional monomers may include, for example, acetoacetamidoethyl(meth)acrylate, acetoacetamidopropyl(meth)acrylate, acetoacetamidobutyl (meth)acrylate, 2,3-di(acetoacetamido)propyl(meth)acrylate, allyl acetoacetamide, and vinyl acetoacetamide; likewise cyanoacetoxy-functional monomers are also suitable, such as, for example, cyanoacetoxyethyl(meth)acrylate, cyanoacetoxypropyl(meth)acrylate, cyanoacetoxybutyl (meth)acrylate, 2,3-di(cyanoacetoxy)propyl(meth)acrylate, allyl cyanoacetate, and vinyl cyanoacetate; as well as cyanoacetamido-functional monomers, such as, for example, cyanoacetamidoethyl(meth)acrylate, cyanoacetamidopropyl (meth)acrylate, cyanoacetamidobutyl(meth)acrylate, 2,3-di (cyanoacetamido)propyl(meth)acrylate, allyl cyanoacetamide, and vinyl cyanoacetamide.

Free radical addition polymerization techniques that can be used to prepare the emulsion copolymer of the present invention are well known in the art.

Anionic surfactants may be used in aid of polymerization such as, for example, nonionic alkali metal or ammonium salts of alkyl, aryl, or alkylaryl sulfates, sulfonates or phosphates; alkyl sulfonic acids; sulfosuccinate salts; fatty acids. Nonionic surfactants may also be included such as, for example, ethylenically unsaturated surfactant monomers and ethoxylated alcohols or phenols. The amount of surfactant used is usually 0.1 to 6% by weight, based on the weight of monomer.

The emulsion copolymer may be prepared by a multistage emulsion polymerization process, in which at least two stages differing in composition are polymerized in sequential fashion. Such a process usually results in the formation of at least two mutually incompatible polymer compositions, thereby resulting in the formation of at least two phases within the polymer particles. Such particles are composed of two or more phases of various geometries such as, for example, core/shell or core/sheath particles, core/shell particles with shell phases incompletely encapsulating the core, core/shell particles with a multiplicity of cores, and interpenetrating network particles. In all cases, the majority of the surface area of the particle will be occupied by at least one outer phase and the interior of the particle will be occupied by at least one inner phase. Each of the stages of the multi-staged emulsion polymer may contain the same monomers, surfactants, chain transfer agents, etc. as disclosed herein-above for the emulsion polymer. The polymerization techniques used to prepare such multistage emulsion polymers are well known in the art such as, for example, U.S. Pat. Nos. 4,325,856, 4,654,397, and 4,814,373.

One preferred emulsion copolymer is a two stage copolymer including in the second stage a monomer mixture that will form a copolymer that has a measured glass transition temperature (calculated Tg) of at least 10° C. greater than the calculated Tg of the first stage of the emulsion copolymer. The second stage monomer mix may be used in the amount of at least 3 wt. %, and up to 15 wt. %, based on the total weight of monomers used to make the emulsion copolymer.

In one process, the aqueous copolymerization mixture may be free of protective colloids.

To enhance scrub resistance, the emulsion copolymers of the present invention are copolymerized using a free radical redox initiator system under emulsion polymerization conditions, the redox initiator system composed of a water-soluble oxidizing agent, an water-insoluble oxidizing agent, and a reducing agent; and effecting the polymerization of at least some of the ethylenically unsaturated monomer. Preferably, the reducing agent is a sulfinic acid, or salts thereof.

From 0.01 to 3.0%, preferably 0.02 to 1%, more preferably 0.05% to 0.5%, by weight of oxidizing agent is used, based on the total weight of monomers used to make the emulsion copolymer. The oxidizing agent includes a water-soluble oxidizing agent such as, for example, hydrogen peroxide and ammonium or alkali metal persulfates, perborates, peracetates, peroxides, and percarbonates; and a water-insoluble oxidizing agent such as, for example, benzoyl peroxide, lauryl peroxide, t-butyl peroxide, t-butyl hydroperoxide, 2,2'-azobisisobutyronitrile, t-amyl hydroperoxide, t-butyl peroxyneodecanoate, and t-butyl peroxypivalate. By "water-insoluble oxidizing agent" herein is meant an oxidizing agent which has a water solubility of less than 20% by weight in water at 25° C.

In addition, redox reaction catalyzing metal salts of iron, copper, manganese, silver, platinum, vanadium, nickel, chromium, palladium, or cobalt may be used at a level of 0.01 to 25 ppm, with or without metal complexing agents. Preferably iron or copper may be used. More preferably, 0.01 to 10 ppm copper may be used.

Suitable reducing agents may include, for example, isoascorbic acid, (meta)bisulfites and sulfinic acid reducing agents.

Preferred sulfinic acid reducing agents, or salts thereof may include, for example, alkylsulfinic acids such as isopropyl sulfinic acid; aryl sulfinic acids such as phenylsulfinic acid; and hydroxyalkyl sulfinic acids such as hydroxymethane sulfinic acid and 2-hydroxy-2-sulfinatoacetic acid and salts of the preceding acids. These are used at a level of 0.01% to 3.0%, preferably 0.01 to 0.5%, more preferably 0.025% to 0.25%, by weight based on the total weight of monomers used to make the emulsion copolymer. A preferred reducing agent is 2-hydroxy-2-sulfinatoacetic acid.

At least some, preferably at least 40% by weight, more preferably at least 75% by weight, most preferably at least 95% by weight, based on dry polymer weight, of the emulsion polymer is formed using the redox initiator system composed of a water-soluble oxidizing agent, an water-insoluble oxidizing agent, and a reducing agent in the absence of any other oxidizing agent and in the absence of any other reducing agent. The emulsion polymerization is contemplated to include embodiments where some of the polymer is introduced by a polymer seed, formed in situ or not, or formed during hold periods or formed during periods wherein the monomer feed has ended and residual monomer is being converted to polymer.

According to the present invention, once the emulsion copolymer is formed, it is formulated with the anion exchange resin and, to enhance performance in the coating and stability, a phosphorus containing surfactant. Suitable phosphorus containing surfactants may be used in the acid form or in the salt form and may be any compound containing a phosphate, such as potassium tripolyphosphate, phosphate ester, or phosphonate group and an organic hydrophobic moiety, for example, an alkyl ethoxylated phosphate. One suitable phosphorous containing surfactant is a polyoxyethylene tridecyl ether phosphate.

A suitable alkyl ethoxylated phosphate surfactant may have an $C_8$ to $C_{30}$ alkyl group, preferably, a $C_{11}$ $C_{12}$ to $C_{18}$ alkyl group, attached to a polyoxyethylene chain having an average degree of polymerization in the range of from 2 to 100. The alkyl ethoxylated phosphate surfactant may be represented by the structure: $R\text{-}(EO)_n\text{—}OPO_3X_2$ wherein R is a $C_8$ to $C_{30}$ alkyl group; EO is a polymerized ethylene oxide unit; n is an integer with a value in the range of from 2 to 100, preferably, from 5 to 50; and each X is independently selected from H or a cation. Examples of suitable cations include alkali metal cations such as lithium, sodium, or potassium; ammonia; and amines such as dimethyl amine, triethanol amine, and methyl amine.

The amount of the phosphorus containing surfactant may range from 0.1 to 5 weight %, preferably in the range of from 0.1 to 3 weight %, and more preferably in the range of from 0.5 to 3 weight %, based on the weight of emulsion copolymer solids.

The compositions of the present invention can be used directly as a stain blocking coating or primer, or can be formulated with conventional coating materials: Coalescents, glycols, fillers, pigments, opacifiers, wetting agents, defoamers, biocides, thickeners, etc. as desired.

The composition of the present invention may applied by conventional application methods such as, for example, brushing and spraying methods such as, for example, roll coating, doctor-blade application, printing methods, air-atomized spray, air-assisted spray, airless spray, high volume low pressure spray, and air-assisted airless spray. Typical substrates to which the composition of the invention may be applied include plastic, wood, metal, plastic, wall board, primed surfaces, previously painted surfaces, and cementitious substrates. Preferred substrates are interior household surfaces that have not been primed, such as wood, veneer, gypsum and wall board.

The substrate may have disposed upon it markings such as those from marking pens, which contain stain bodies such as tannins where such stains are capable of appearing on the surface of a dry later-deposited coating stains from the substrate, or from sources external to the substrate (for example cigarette smoke) become solubilized or dispersed in wet coating compositions applied to the substrate. The composition of the invention blocks and/or locks in the stains so that they cannot appear on the visible surface of dry coatings.

After application, the composition of the present invention is typically dried, or allowed to dry, at a temperature from 10° C. to 95° C.

EXAMPLES

The following examples illustrate the present invention.

Synthesis Example 1

Emulsion Copolymer

A first monomer emulsion was prepared by mixing 100 g of deionized water, 5.20 g (30% active) anionic surfactant $C_{12}$ to $C_{15}$ alkyl ethoxylate sulfate (Surfactant A), 36 g butyl acrylate, 143.9 g methyl methacrylate, 20 g methacrylic acid, 0.1 g styrene, and 10.2 g of a methyl mercaptan chain transfer agent. A second monomer emulsion was prepared by mixing 495 g of deionized water, 79.9 g (30% active) anionic Surfactant A ($C_{12}$ to $C_{15}$ alkyl ethoxylate sulfate), 468 g butyl acrylate, 540 g ethyl acrylate, 702 g methyl methacrylate, 36 g (60% active) phosphoethyl methacrylate, 36 g acetoacetyloxyethyl methacrylate, and 36 g (50% active) ureido methacrylate.

To a 5-liter, four necked round bottom flask (reactor) equipped with a paddle stirrer, a thermometer, nitrogen inlet, and a reflux condenser was added 700 g of deionized water and 13.4 g (30% active) Surfactant A. The contents of the flask were heated to 86° C. under a nitrogen atmosphere and stirring was initiated. A buffer solution of 2.1 g sodium carbonate dissolved in 25 g of deionized water was added to the flask. A total of 81 g of the first emulsion monomer emulsion was then added, followed by a solution of 4 g ammonium persulfate dissolved in 27 g deionized water. After the reaction temperature peaked, a mixture of a solution of 19.8 g 0.15% w/w ferrous sulfate heptahydrate in water and a solution of 2.9 g of a 1% w/w solution of ethylenediaminetetraacetic acid tetrasodium salt in water was added. Two cofeed solutions were then fed to the flask over a period of 85 minutes: The first cofeed solution was made from 4.0 g of 85% t-amyl hydroperoxide 1.2 g of Surfactant A, and 95 g deionized water; and the second cofeed solution was made from 3.08 g of isoascorbic acid and 100 g deionized water. Two minutes after the start of cofeeds, the remaining first monomer emulsion was fed to the flask over 15 minutes while maintaining the temperature at 86° C.

Once the first monomer emulsion feed was complete, the jar containing the emulsion was rinsed with deionized water, that rinse was added to the flask, the contents of the flask were held at 86° C. for 20 minutes and the cofeeds were suspended. After the 20 minute hold, the cofeeds were resumed, and the second monomer emulsion was fed to the flask over 65 minutes. When 34 wt. % of the second monomer emulsion had been added, 11.3 g ammonium hydroxide (28% w/w aqua ammonia) solution was added to the second cofeed solution. Following the addition of the second monomer emulsion, the jar containing the emulsion was rinsed with deionized water, that rinse was added to the flask, the contents of the flask were held at 86° C. for 15 minutes. After the 15 minute hold, the contents of the flask were cooled to 60° C. and a catalyst/activator pair (tertiary-butyl hydroperoxide/isoascorbic acid) were added to the flask to reduce residual monomer. The polymer was then neutralized to pH 7.7 with an ammonium hydroxide solution. The measured particle size was 137 nm and the solids were 50.3 wt. %.

Synthesis Example 2

Single Stage EHA/Styrene Emulsion Copolymer

A monomer emulsion was prepared by mixing 415 g deionized water, 79.6 g (31% active) anionic surfactant ($C_{11}$-$C_{12}$)—O($EO$)$_6$ sulfosuccinate Na+, 6.9 g (25% active) anionic surfactant sodium dodecylbenzene sulfonate-branched 800 g 2-ethylhexyl acrylate, 695 g styrene, 155 g methyl methacrylate, 55.2 g phosphoethyl methacrylate (60% active), 34 g (50%) ureido methacrylate and 4 g of n-dodecyl methacrylate.

A 5-liter reactor, four-necked round bottom flask equipped with a paddle stirrer, a thermocouple, nitrogen inlet, and reflux condenser was assembled. To the flask was added 744 g deionized water and 16.3 g (30% w/w active) of anionic laureth-4-sulfate and stirring was initiated. The contents of the flask were heated to 60° C. under a nitrogen atmosphere. A 93 g portion of the monomer emulsion was added to the reaction flask. The contents were stirred for 1 minute then a solutions 0.03 g ferric sulfate in 22 g of deionized water, 0.9 g t butyl hydroperoxide (70% w/w) in 5 g deionized water and 0.5 g isoascorbic acid in 11 g deionized were added separately. After another 2 minutes the remainder of the monomer emulsion and a solution of 9 g sodium persulfate in 260 g deionized water and 5 g of isoascorbic acid in 260 g deionized water were fed separately to the flask at a rate of 7 g/min for the monomer emulsion and 0.8 g/min for the t-butyl hydroxide, and isoascorbic acid feeds for 22 minutes, the feed rates were then increased to 13.4 g/min and 1.6 g/min respectively until consumed. The contents of the flask were maintained at 60° C. during the addition. The emulsion copolymer was rinsed with 5 g deionized rinse. A solution of 4 g (14% w/w) aqueous ammonia was then added and after 10 minutes a redox pair was added to reduce residual monomer. The batch was cooled to room temperature. While cooling and at <50° C., 26 g of aqueous ammonium hydroxide (28% w/w) was added. 26 g of ($C_{11}$-$C_{13}$)-(EO)$_{40}$ phosphoric acid ester was then added, followed by an additional 4.4 g of aqueous ammonium hydroxide (28%). The resulting emulsion copolymer had an average particle size was found to be 92 nm, with a solids content of 44.5 wt. % and a pH of 7.7.

Preparation Example 3

Anion Exchange Resin

An anion exchange resin copolymer bead of a crosslinked 98.5 wt. % styrene/1.5 wt. % divinyl benzene copolymer, based on the total weight of monomers used to make the copolymer, contains about 1 quaternary ammonium group per benzene nucleus. The chloride form of the resin was used.

Preparation Example 4

Grinding Anion Exchange Resin

Example 3 having an average bead size of about 0.6-0.8 mm and a water content of 45% w/w were ground as follows:

To 200 grams of the anion exchange resin was added 250 grams of water to adjust the polymer solids to 15-20% w/w. This mix was ground for three hours on a Red Devil Paint Conditioner Model #5410-00 (Union, N.J.) using 0.5 inch zirconia media to obtain a weight average particle size of approximately 5 μm as measured on a Mastersizer 2000 (Malvern Instruments Ltd., Malvern, UK). A broad particle size distribution was obtained as indicated on the analysis report, covering the range of about 1 micron to 40 microns.

Some ingredients used in binders and coating formulations are defined, as follows:
  Defoamer: Mineral oil-free with polysiloxane
  Polyacid Dispersant: Polyacid addition copolymer
  Phosphate Dispersant: Inorganic phosphorus compound with multiple phosphorus-containing functional groups
  Extender: Nepheline syenite
  Coalescent: Organic ester, non-volatile under use conditions
  Ropaque™ Polymer: Opaque hollow core polymer
  Rheology Modifier: Associative thickener copolymer Example 5

Pigment Grind and Coating Formulation (Control)

An eggshell interior wall paint was prepared in a conventional fashion using the latex emulsion copolymer from Example 1 according to the formulation as described in Table 1, below. The components of the pigment grind were milled on a high speed disk disperser. In the letdown, the listed ingredients were added in the order listed in Table 1, and the entire pigment grind was added in the letdown between the coalescent and the opaque polymer.

TABLE 1

(CONTROL) Formulation of Example 1 Aqueous Coating Composition

| Material Name | Amount (grams) |
|---|---|
| Grind | |
| Titanium Dioxide | 274.32 |
| Water | 20 |
| Anionic Phosphate Surfactant | 3.70 |
| Defoamer | 1.0 |
| Polyacid Dispersant | 9.18 |
| Phosphate Dispersant | 2 |
| Extender | 147.73 |
| Attapulgite Clay | 3 |
| Celite 281 | 25 |
| Water | 30 |
| LetDown | |
| Emulsion Copolymer (Example 1) | 407.6 |
| Water | 50 |
| Defoamer | 1.0 |
| Coalescent | 11.02 |
| Ropaque ™ Polymer | 50 |
| Rheology Modifier | 49 |
| Water | 44.58 |

Example 6

Pigment Grind and Coating Formulation

Example 1 and Example 4 were prepared as shown in Table 2, below, using the method described in Example 5.

Example 7

Pigment Grind and Coating Formulation (Control)

In Example 7, the Example 2 emulsion copolymer was formulated as described in Example 5, above, with the Example 2 emulsion copolymer instead of the Example 1 emulsion copolymer.

Example 8

Pigment Grind and Coating Formulation

In Example 8, the Example 2 emulsion copolymer and the anion exchange resin of Example 4 were formulated as described in Example 6 above, with the Example 2 emulsion copolymer instead of the Example 1 emulsion copolymer.

TABLE 2

Formulation of Examples 1 and 4 Aqueous Coating Composition

| Material Name | Amount (grams) |
|---|---|
| Grind | |
| Titanium Dioxide | 274.32 |
| Water | 20 |
| Anionic Phosphate Surfactant | 3.70 |

TABLE 2-continued

Formulation of Examples 1 and 4 Aqueous Coating Composition

| Material Name | Amount (grams) |
|---|---|
| Defoamer | 1.0 |
| Polyacid Dispersant | 9.18 |
| Phosphate Dispersant | 2 |
| Extender | 147.73 |
| Attapulgite Clay | 3 |
| Celite 281 | 25 |
| Water | 30 |
| LetDown | |
| Example 4 | 26.16 |
| Water | 50 |
| Defoamer | 1.0 |
| Coalescent | 11.02 |
| Ropaque ™ Polymer | 50 |
| Example 1 | 407.6 |
| Rheology Modifier | 38.4 |
| Water | 29 |

Example 9

Macroporous Anion Exchange Resin

A macroporous anion exchange resin copolymer, consisting of a crosslinked 96% styrene/4.0% divinyl benzene copolymer, based on the total weight of monomers, and containing about 1 quaternary ammonium group per benzene nucleus was prepared in the manner of example 4.

Example 10

Pigment Grind and Coating Formulation

In Example 10, the Example 1 emulsion copolymer and Example 9, were formulated as described in Example 6 above, with the Example 9 macroporous anion exchange resin copolymer instead of the Example 4 anion exchange resin copolymer.

Examples 5, 6, 7, 8 and 10 were tested for the primer property marker stain blocking. Example 5 and 6 were further test for water stain blocking, as well as for topcoat properties including scrub resistance and household stain removal, according to the following test methods:

Marker Stain Blocking Test:

Draw down a flat interior test paint with a 75 μm (3 mil) Bird film applicator over white Leneta Penopac WB plain white chart and dry for 7 days at ambient conditions (25° C./50% RH). When dried, apply markers down the length of the film and dry for at least four days. A variety of different types and colors of markers should be used, as shown in Table 2A, below.

TABLE 2A

| Stains | | | |
|---|---|---|---|
| Stain No | Stain | Color | Type |
| 1 | Permanent Marker | Black | Hydrophobic |
| 2 | Permanent Marker | Red | Hydrophobic |
| 3 | Ballpoint Pen | Blue | Hydrophobic |
| 4 | Ballpoint Pen | Purple | Hydrophilic |
| 5 | Washable Marker | Red | Hydrophilic |
| 6 | Washable Marker | Blue | Hydrophilic |
| 7 | Washable Marker | Green | Hydrophilic |

To assess stain blocking, draw down test paint side by side with a desired control perpendicular to the marker stains using a 178 μm (7 mil) "U" shaped straddle bar film applicator and dry for four hours; then topcoat dried films with a flat interior test paint, using a 256 μm (10 mil) "U" shaped straddle bar film applicator and allow the film to dry overnight. Stain blocking is visually evaluated using a rating scale of 1-10 as described in Table 2B, below:

TABLE 2B

Visual Stain Blocking Rating Scale

| Rating | Quality | Result | Standard |
|---|---|---|---|
| 10 | Excellent | Stain completely blocked | No stain is visible |
| 9 | Very Good | Slight staining | 10% of stain visible |
| 8 | Good | Slight to Moderate staining | 20% of stain visible |
| 7 | Good | Moderate staining | 30% of stain visible |
| 6 | Fair | Moderate to Heavy staining | 40% of stain visible |
| 5 | Fair | Moderate to Heavy staining | 50% of stain visible |
| 4 | Marginal | Heavy staining | 60% of stain visible |
| 3 | Poor | Heavy staining | 70% of stain visible |
| 2 | Very Poor | Severe staining | 80% of stain visible |
| 1 | Very Poor | Extremely severe staining | 90% of stain visible |

Household Stain Removal Test: (Based on ASTM Method D4828):

1. Cast the test paint on a black vinyl chart with a 178 μm (7 mil) (wet) Dow applicator. Cast a control paint adjacent to the test paint. Dry for 1 week at 25° C./50% relative humidity.

2. Mark 13 mm (½") sections across the test panel. The total number of sections should correspond to the total number of stains selected plus a 13 mm (½") gap between stains.

3. Each stain is then applied uniformly to fill in the test area. In order to contain stains to the test area, wet stains, such as coffee, can be applied over a 13 mm (½") strip of cheesecloth to soak up excess liquid and prevent it from bleeding into the other stained areas.

4. Allow the stains to soak in for at least 1 hour.

5. Wipe off the excess stain with a dry paper towel or dry cheesecloth.

6. Soak a sponge in tap water at ambient temperature until saturated. Remove the sponge and squeeze with one hand until no more water drips from the sponge. Replace the sponge in a weighted holder (combined weight of holder and sponge should be 1000 gm) and apply 10 mL Leneta Non-Abrasive Scrub Medium (The Leneta Company, Mahwah, N.J.) and 15 mL water to sponge.

7. Scrub panel for 100 cycles with the 1000 gm boat, using a cabled scrub testing device.

8. Rinse panel thoroughly with water, let dry and then rate the degree of stain removal visually, on a scale of 1 to 10, corresponding to 10% to 100% removal, by comparing to unscrubbed sites (i.e. 10 is the best score, indicating that the entire stain was removed).

Scrub Resistance Test: (Based on ASTM D 2486-06)

A. Preparation of Apparatus:

1. Abrasion Tester—An abrasion testing device is used which consists of a brush clamped into a bracket which is moved back and forth over the dried, applied paint film by means of a set of cables on either side. The abrasion tester must be leveled before use and operated at 37±1 cycles/minute.

2. Aluminum Plate—A 6½"×17½" metal plate with two 10 mils×½"×6½" metal shims.

3. Brush—The bristles, if new, must be leveled before use to permit uniform wear on the paint surface. Leveling is accomplished by running the brush over 100 or 120 mesh aluminum oxide close grain sandpaper.

B. Test:

1. Draw down the paint on a black vinyl chart (Type P-121-10N, The Leneta Company) using 178 μm (7 mil) opening of a 7/10 Dow film caster, starting from the secured end of the panel. The time for application should be fairly slow, 3 to 4 seconds from end to end, to prevent formation of pinholes in the film. Three drawdowns should be done for each sample. Air dry in a horizontal position for 7 days in an open room kept at ambient conditions.

2. Cut each chart in half lengthwise for a total of six strips. Test a minimum of three strips, making sure that at least one is used from each chart.

3. Secure the drawdown to the abrasion tester by using a gasketed frame and brass weights or clamps.

4. Mount the brush in the holder. Spread 10 grams of a scrub medium (Abrasive Scrub Medium, Type SC-2, The Leneta Company) evenly on the brush bristles and place the brush at the center of the path. The brush is bristle side up when applying the scrub medium and water; carefully turn it bristle-side down before starting the test.

5. Start the test. After each 400 cycles before failure, remove the brush (do not rinse); add 10 gm of stirred scrub medium; replace the brush. Place 5 ml of water on the brush before continuing.

6. Record the total number of cycles it takes to remove the paint fully in one continuous line ("cut-through"). Do this for each shim.

7. Report the scrub removal cycles by calculating the total average cut-through from all strips. A minimum of six measurements should be used. Results are shown in Tables 3, 4, 5, and 6 below.

TABLE 3

Marker Stain Blocking

| Stain No. | Example 6 | Example 5 (control) | Example 8 | Example 7 (control) | Example 10 |
|---|---|---|---|---|---|
| 1 | 9 | 5 | 10 | 6 | 6 |
| 2 | 10 | 6 | 10 | 8 | 6 |
| 3 | 10 | 7 | 10 | 9 | 6 |
| 4 | 9.5 | 4 | 10 | 6 | 4 |
| 5 | 10 | 2 | 10 | 6 | 3 |
| 6 | 9.5 | 2 | 10 | 6 | 3 |
| 7 | 9.5 | 3 | 10 | 6 | 3 |

Water Stain Blocking Test Method:

Armstrong 823 ceiling tiles (Lancaster, Pa.) were cut into 5"×7" sections (⅝" thick), saturated with water and air dried in ambient conditions for two days. The test paint was brush-applied side-by-side with a commercial latex primer using a natural spread rate and dried in ambient conditions for four hours. Then they were topcoated with a commercial interior flat latex paint which was brush-applied at a natural spread rate. Tiles were immediately put in a 60° C. oven and dried overnight. Tiles were removed and rated using the Visual Stain Blocking Rating Scale described in Table 2B, above. A rating of 10 is the best and indicates that the water stain was completely blocked and the film was white.

TABLE 4

Water Stain Blocking

| Example 6 | Example 5 |
|---|---|
| 10 | 4 |

As illustrated in Table 3, above, a paint made according to the present invention in Examples 6 and 8 with a phosphorus acid monomer containing emulsion copolymer and an anion exchange resin copolymer demonstrates much better marker stain blocking over a variety of hydrophobic inks and dramatically superior marker stain blocking over a variety of and hydrophilic inks when compared to the same emulsion copolymer without an anion exchange resin, respectively, in Examples 5 and 7. In Example 10, a paint made with the composition of Example 6 using a macroporous anion exchange resin copolymer, not a part of the present invention, and not an anion exchange resin copolymer showed inconsistent improvement in marker stain blocking over a variety of hydrophobic and hydrophilic inks.

In addition to outstanding primer marker stain blocking, the aqueous compositions of the present invention enable excellent topcoat properties by including only about 2 wt. % of anion exchange resin, based on total composition solids.

Table 4 highlights how water stains are completely blocked when a gelular anion exchange resin copolymer having 1.5 wt. % of copolymerized crosslinker is in the composition, as in Example 6, dramatically improving on the same composition without the gelular anion exchange resin beads.

TABLE 5

Scrub Resistance

| Scrub Resistance | Example 6 | Example 5 |
|---|---|---|
| Average Cycles | 1113 | 1319 |

TABLE 6

Household Stain Removal

| Household Stain | Example 6 | Example 5 |
|---|---|---|
| Crayon | 10 | 10 |
| Pencil | 4 | 4 |
| Lipstick | 9 | 9 |
| Washable Marker | 10 | 10 |
| Pen | 8 | 8 |
| Mustard | 5 | 5 |
| Coffee | 6 | 7 |

As shown in the above Tables 5 and 6, the aqueous compositions of the present invention in Example 6 retained the top coat properties of scrub resistance and stain removal as the same composition without the anion exchange resin. Hence, in the present invention the aqueous compositions enable use of the anion exchange resins without compromising other properties.

We claim:

1. A one component aqueous composition comprising (i) from 0.01 to 7 wt. %, based on the total weight of solids in the composition, of anion exchange resin beads having a weight average particle size of from 0.1 to 20 μm and having a copolymerized crosslinker content of from 0.5 to 2.0 wt. %, based on the total weight of monomers used to make the anion exchange resin copolymer, the anion exchange resin copolymer beads being chosen from gelular beads, beads having a dual morphology, and mixtures thereof, (ii) one or more emulsion copolymer having a copolymerization residue of one or more phosphorus acid monomer, and having an anionic surfactant or its polymerization residue and a reductant or its polymerization residue and, (iii) at least one phosphorous containing surfactant in the amount of from 0.1 to 5 wt. %, based on the weight of emulsion copolymer solids.

2. The aqueous composition as claimed in claim 1, wherein the amount of the anion exchange resin copolymer is 4 wt. % or less, based on the total weight of solids in the composition.

3. The aqueous composition as claimed in claim 1, wherein the anion exchange resin has a weight average particle size of 10 μm or less.

4. The aqueous composition as claimed in claim 1, wherein the anion exchange resin copolymer has a copolymerized crosslinker content of from 0.7 to 1.75 wt. %, based on the total weight of monomers used to make the anion exchange resin copolymer.

5. The aqueous composition as claimed in claim 1, wherein the anion exchange resin copolymer has quaternary ammonium anion exchange groups.

6. The aqueous composition as claimed in claim 1, wherein the phosphorous containing surfactant of the present invention is chosen from a phosphate surfactant, a phosphonate surfactant, and mixtures thereof.

7. The aqueous composition as claimed in claim 6, wherein the phosphorus containing surfactant is an alkyl alkoxylated phosphate.

8. A coating composition comprising the aqueous composition of claim 1 and having a VOC content of from 0 g/l to 150 g/l.

9. A method for using the coating composition of claim 7 as a single coat primer plus topcoat comprising applying the coating composition to a substrate which has no primer on it to form a coating having improved stain block resistance.

10. A method for making an aqueous composition comprising aqueous emulsion polymerizing at least one ethylenically unsaturated monomer and one or more phosphorus acid monomer in the presence of a free radical redox initiator system and in the presence of an anionic surfactant to form an emulsion copolymer; and, formulating the emulsion copolymer with a phosphorus containing surfactant and an anion exchange resin copolymer in the form of gelular beads, beads having a dual morphology, and mixtures thereof, the beads having a weight average particle size of from 0.1 to 20 μm and having a copolymerized crosslinker content of from 0.5 to 2.0 wt. %, based on the total weight of monomers used to make the anion exchange resin copolymer, to form an aqueous composition having the anion exchange resin of the present invention in the amount of from 0.01 to 7 wt. %, based on the total weight of solids in the composition, and the phosphorous containing surfactant of the present invention in the amount of from 0.1 to 5 wt. %, based on the weight of emulsion copolymer solids.

11. The aqueous composition as claimed in claim 1, wherein the (ii) one or more emulsion copolymer has a copolymerization residue of one or more phosphorus acid monomer in the amount of from 0.5 to 2.5 wt. %, based on the total weight of monomers used to make the emulsion copolymer.

* * * * *